(12) United States Patent
Zhou

(10) Patent No.: US 11,157,959 B2
(45) Date of Patent: Oct. 26, 2021

(54) MULTIMEDIA INFORMATION PROCESSING METHOD, APPARATUS AND SYSTEM, AND COMPUTER STORAGE MEDIUM

(71) Applicant: TENCENT TECHNOLOGY (SHENZHEN) COMPANY LIMITED, Guangdong (CN)

(72) Inventor: Bin Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 286 days.

(21) Appl. No.: 15/665,678

(22) Filed: Aug. 1, 2017

(65) Prior Publication Data
US 2017/0330238 A1    Nov. 16, 2017

Related U.S. Application Data

(63) Continuation of application No. PCT/CN2016/080078, filed on Apr. 22, 2016.

(30) Foreign Application Priority Data

Jul. 17, 2015   (CN) .......................... 201510424690.8

(51) Int. Cl.
*G06Q 30/00* (2012.01)
*G06Q 30/02* (2012.01)
(Continued)

(52) U.S. Cl.
CPC ..... *G06Q 30/0262* (2013.01); *H04N 21/2668* (2013.01); *H04N 21/431* (2013.01);
(Continued)

(58) Field of Classification Search
CPC ................................... G06Q 30/0207–30/0277
(Continued)

(56) References Cited

U.S. PATENT DOCUMENTS

| 8,805,715 | B1* | 8/2014 | Jones | G06Q 30/02 |
| | | | | 705/14.66 |
| 9,026,033 | B2* | 5/2015 | Khedouri | H04N 21/2223 |
| | | | | 455/3.01 |

(Continued)

FOREIGN PATENT DOCUMENTS

| CN | 103414940 A | 11/2013 |
| CN | 104615432 A | 5/2015 |

(Continued)

OTHER PUBLICATIONS

Ken East. Best Android apps for singers. (Jun. 11, 2012). Retrieved online Dec. 3, 2020. https://www.androidauthority.com/best-android-apps-singers-singing-93546/ (Year: 2012).*

(Continued)

*Primary Examiner* — James A Reagan
(74) *Attorney, Agent, or Firm* — Anova Law Group, PLLC

(57) ABSTRACT

A multimedia information processing method, apparatus and system, and a computer storage medium are disclosed. The method includes that: a first operation is acquired, the first operation being configured to indicate to start a first Application (APP); a first request is triggered, the first request being configured to request for acquisition of first multimedia information associated with the first APP; the first multimedia information is received, the first multimedia information including prompting information in an interaction form; the first multimedia information is played, and the prompting information in the interaction form is displayed in the display region; and a second operation for the prompting information in the interaction form is acquired, and the first APP is started after an operation result is obtained.

11 Claims, 17 Drawing Sheets

(51) Int. Cl.
*H04N 21/431* (2011.01)
*H04N 21/2668* (2011.01)
*H04N 21/81* (2011.01)
*H04N 21/472* (2011.01)
*H04N 21/422* (2011.01)

(52) U.S. Cl.
CPC ......... *H04N 21/812* (2013.01); *H04N 21/422* (2013.01); *H04N 21/472* (2013.01)

(58) Field of Classification Search
USPC .............................................. 705/14.1–14.73
See application file for complete search history.

(56) References Cited

U.S. PATENT DOCUMENTS

| | | | | |
|---|---|---|---|---|
| 2002/0038597 | A1* | 4/2002 | Huopaniemi | G10H 1/00 84/609 |
| 2004/0049540 | A1* | 3/2004 | Wood | H04N 21/8549 709/203 |
| 2007/0088801 | A1* | 4/2007 | Levkovitz | H04L 12/1859 709/217 |
| 2008/0163302 | A1* | 7/2008 | Khedouri | G11B 27/034 725/46 |
| 2010/0030641 | A1* | 2/2010 | Ibenforth | G06Q 30/0251 705/14.49 |
| 2011/0191174 | A1 | 8/2011 | Ibenforth | |
| 2013/0070093 | A1* | 3/2013 | Rivera | G06Q 20/384 348/143 |
| 2014/0019253 | A1* | 1/2014 | Ricasata | G06Q 30/0241 705/14.64 |
| 2014/0052770 | A1* | 2/2014 | Gran | H04N 21/26258 709/203 |
| 2014/0108144 | A1* | 4/2014 | Kumar | G06Q 30/0251 705/14.54 |
| 2014/0116231 | A1* | 5/2014 | Leflore | G09B 15/023 84/466 |
| 2014/0129348 | A1 | 5/2014 | Ibenforth et al. | |
| 2015/0256877 | A1* | 9/2015 | Yoneda | G06Q 30/02 725/34 |
| 2017/0330238 | A1 | 11/2017 | Zhou | |

FOREIGN PATENT DOCUMENTS

| | | | | |
|---|---|---|---|---|
| EP | 0424071 | A3 * | 8/1991 | G10L 25/78 |
| JP | 06259090 | A * | 9/1994 | G10L 15/1822 |
| JP | 2001291016 | A | 10/2001 | |
| JP | 2002183579 | A | 6/2002 | |
| JP | 2002318955 | A | 10/2002 | |
| JP | 2004252956 | A | 9/2004 | |
| JP | 2012247820 | A | 12/2012 | |
| JP | 2015049689 | A | 3/2015 | |
| JP | 2015099017 | A | 5/2015 | |
| JP | 2018517195 | A | 6/2018 | |
| KR | 20080049647 | A * | 6/2008 | G10L 15/285 |
| KR | 20130007998 | A | 1/2013 | |
| WO | 2014011798 | A1 | 1/2014 | |
| WO | 2017012380 | A1 | 1/2017 | |

OTHER PUBLICATIONS

Notification of the First Office Action of Japanese application No. 2017-549477, dated Dec. 4, 2018.
International Search Report in international application No. PCT/CN2016/080078, dated Jul. 26, 2016.
English Translation of the Written Opinion of the International Search Authority in international application No. PCT/CN2016/080078, dated Jul. 26, 2016.
First Office Action (re-examinaton) of the Korean application No. 10-2017-7029255, dated Aug. 29, 2019.
Decision of Refusal of the Japanese application No. 2017-549477, dated Jul. 23, 2019.
First Office Action of the Chinese application No. 201510424690.8, dated Mar. 14, 2019.

* cited by examiner

MULTIMEDIA INFORMATION PROCESSING METHOD, APPARATUS AND SYSTEM, AND COMPUTER STORAGE MEDIUM

CROSS REFERENCE TO RELATED APPLICATIONS

This is a continuation application of International Patent Application No. PCT/CN2016/080078, filed on Apr. 22, 2016, which claims priority to Chinese Patent Application No. 201510424690.8, filed before Chinese Patent Office on Jul. 17, 2015 and entitled "Multimedia information processing method, equipment and system". The disclosure of the application is incorporated by reference herein in its entirety.

TECHNICAL FIELD

The disclosure relates to an information processing method, and in particular, to a multimedia information processing method, apparatus and system, and a computer storage medium.

BACKGROUND

At present, since the mobile Internet era, a thing and its function have not been changed, it can also be said that an experience of the era is copied. The thing is splash screen which is displayed for a few seconds until a program has been started. Splash screen was proposed because it will take a few blank seconds for an Application (APP) to be started under an insufficient function, for purpose of waiting for reaction of a system or waiting for acquisition of some information required for starting the APP from a network. However, the few seconds are far more important than a screen saver. When a screen saver is being demonstrated, a user may not be at a computer, and splash screen appears when the user is intended to start this APP program, so that the user must wait and accept the splash screen, and a splash screen advertisement emerges at the right moment. The splash screen advertisement refers to a short static-picture-based advertisement displayed on a user interface of a terminal when an APP is loaded.

Along with improvement of a market scale and media value of network videos, more television advertisers start repositioning and increase investment in splash screen advertisement of network videos. However, for rapid traffic changes and advertisement inventory digestion, some video websites also start continuously developing new advertisement varieties and also increase playing time lengths of existing splash screen advertisement varieties, which causes extremely poor user experiences.

SUMMARY

In view of this, embodiments of the disclosure provide a multimedia information processing method, apparatus and system, and a computer storage medium, to solve the problem in a conventional art.

The technical solutions of the embodiments of the disclosure are implemented as follows.

The embodiments of the disclosure provide a multimedia information processing method, which may be applied to a terminal, the terminal having a display region and the method including:

a first operation is acquired by a terminal, the first operation being configured to indicate to start a first APP;

a first request is triggered by the terminal, the first request being configured to request for acquisition of first multimedia information associated with the first APP;

the first multimedia information is received by the terminal, the first multimedia information including prompting information in an interaction form;

the first multimedia information is played by the terminal, and the prompting information in the interaction form is displayed in the display region, wherein the prompt information in the interaction form comprises at least information for prompting a user to interact according to the preset interaction strategy; and a second operation for the prompting information in the interaction form is acquired by the terminal, and the first APP is started after a result of the second operation is obtained.

The embodiments of the disclosure further provide a multimedia information processing method, which may be applied to a server, the method including:

a first request is received by a server:

the first request is parsed by the server to obtain an APP identifier of a first APP;

first multimedia information associated with the first APP is determined by the server according to the APP identifier; and the first multimedia information is sent by the server, the first multimedia information including prompting information in an interaction form, wherein the prompt information in the interaction form comprises at least information for prompting a user to interact according to the preset interaction strategy.

The embodiments of the disclosure further provide a terminal, which may have a display region and include: a display and a processor, wherein the processor may be configured to execute the following operations through executable instructions:

acquiring a first operation, the first operation being configured to indicate to start a first APP;

triggering a first request, the first request being configured to request for acquisition of first multimedia information associated with the first APP;

receiving the first multimedia information, the first multimedia information including prompting information in an interaction form:

playing the first multimedia information through the display, and displaying the prompting information in the interaction form in the display region; and acquiring a second operation for the prompting information in the interaction form, and starting the first APP after a result of the second operation is obtained, wherein the prompt information in the interaction form comprises at least information for prompting a user to interact according to the preset interaction strategy.

The embodiments of the disclosure further provide a server, which may include a processor, configured to execute the following operations through executable instructions:

receiving a first request;

parsing the first request to obtain an APP identifier of a first APP;

determining first multimedia information associated with the first APP according to the APP identifier; and sending the first multimedia information, the first multimedia information including prompting information in an interaction form.

The embodiments of the disclosure further provide a multimedia information processing system, which may include a terminal and a server, the terminal having a display region, the terminal including a display and a first processor and the server including a second processor, wherein the first processor may be configured to execute the following operations through executable instructions: acquiring a first operation, the first operation being configured to indicate to start a first APP, triggering a first request, the first request being configured to request for acquisition of first multimedia information associated with the first APP, receiving the first multimedia information, the first multimedia information including prompting information in an interaction form, playing the first multimedia information through the display, displaying the prompting information in the interaction form in the display region, acquiring a second operation for the prompting information in the interaction form, and starting the first APP after an operation result is obtained; and the second processor may be configured to execute the following operations through executable instructions: receiving the first request, parsing the first request to obtain an APP identifier of the first APP, determining the first multimedia information associated with the first APP according to the APP identifier, and sending the first multimedia information.

The embodiments of the disclosure provide a computer storage medium, in which a computer program may be stored, the computer program being configured to execute the abovementioned multimedia information processing method.

In the embodiments of the disclosure, the terminal acquires the first operation, the first operation being configured to indicate the first APP to be started, triggers the first request, the first request being configured to request for acquisition of the first multimedia information associated with the first APP, receives the first multimedia information, the first multimedia information including the prompting information in the interaction form, plays the first multimedia information, displays the prompting information in the interaction form in the display region, acquires the second operation for the prompting information in the interaction form, and starts the first APP after the operation result is obtained. Therefore, types of splash screen advertisements are expanded, and interaction with a user is added to achieve a splash screen advertisement promotion deepening effect and improve user experiences.

BRIEF DESCRIPTION OF DRAWINGS

FIG. 10-1 to FIG. 10-6 are display effect diagrams of a user interface of a terminal corresponding to a multimedia information processing method according to an application example of the disclosure.

DETAILED DESCRIPTION

The technical solutions of the disclosure will be further described below in detail with reference to the drawings and specific embodiments.

First Embodiment

Figure 1:
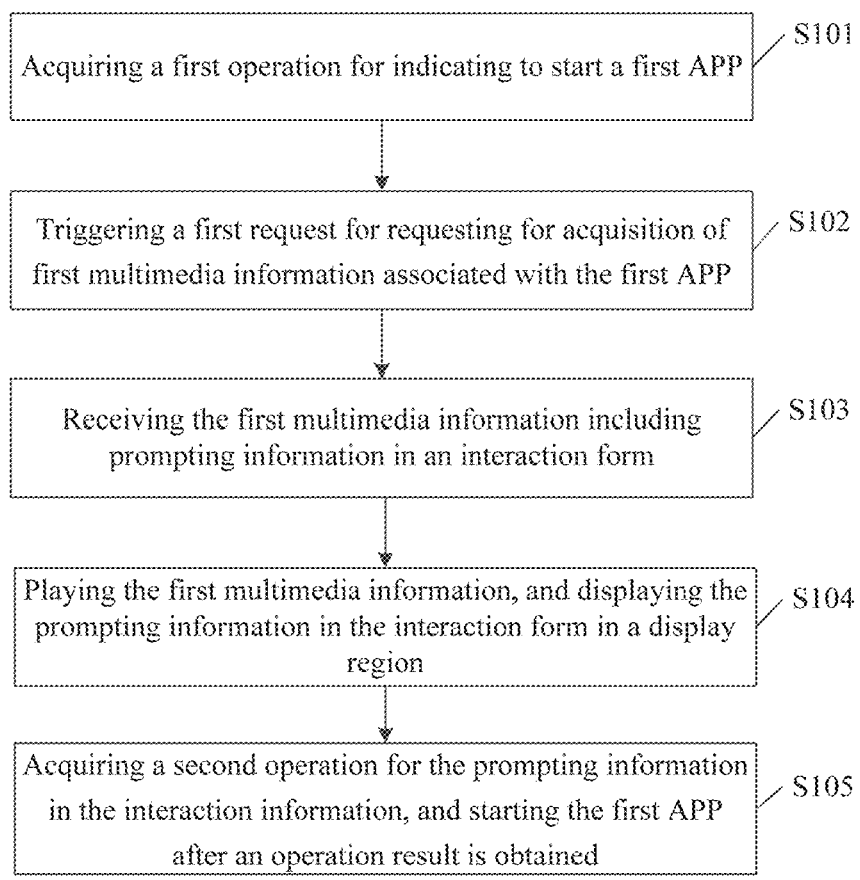
FIG. 1 is an implementation flowchart of a multimedia information processing method according to a first embodiment of the disclosure.

The embodiment of the disclosure provides a multimedia information processing method. The multimedia information processing method is applied to a terminal. The terminal has a display region. FIG. 1 is an implementation flowchart of a multimedia information processing method according to the first embodiment of the disclosure. As shown in FIG. 1, the method includes the following steps.

In step S101, a first operation is acquired. The first operation is configured to indicate to start a first APP.

Specifically, the first operation may be that a user selects and triggers an icon of multiple APP icons corresponding to the first APP in a display interface of the terminal by clicking a mouse, a button or a touch screen to trigger the terminal to start the first APP. Correspondingly, the terminal acquires the first operation which indicates to start the first APP.

Here, the terminal may include a mobile terminal or a non-mobile terminal. The non-mobile terminal includes a desktop computer. The mobile terminal includes a smart phone, a tablet computer, a notebook computer, a personal digital assistant and the like. The terminal includes a display screen, and the display region is a region of the display interface provided for the user on the display screen.

Here, the first APP includes a video APP, a navigation APP, an E-commerce APP, a game APP, a chatting APP and the like. Here, the video APP may be YouKu, Tencent Video or the like. The first APP may be pre-downloaded to the terminal and successfully installed on the terminal, so that the terminal may start the first APP after acquiring the first operation which indicates to start the first APP.

In step S102, a first request is triggered. The first request is configured to request for acquisition of first multimedia information associated with the first APP.

Here, the operation that the first request is triggered is implemented as follows: the terminal sends the first request for acquisition of the first multimedia information associated with the first APP to a server during a time period when the terminal is waiting for the first APP to be started.

Here, before the terminal triggers the first request, the terminal has established a connection with the server. Here, a network connection is established between the terminal and the server. The network connection may be a wired connection, a wireless connection or a wired and wireless mixed network connection. For example, the server and the terminal may establish the wireless connection in a wireless connection manner. The wireless connection manner may specifically be a Wireless-Fidelity (WiFi) connection manner or a Bluetooth connection manner. Specifically, each of the terminal and the server is provided with a WiFi module (or a Bluetooth module). The terminal establishes the wireless connection with the WiFi module (or Bluetooth module) of the server through own WiFi module (or Bluetooth module).

In the embodiment, the first multimedia information may be splash screen advertisement information. The splash screen advertisement information may include a picture, video advertisement material or the like.

Here, the first multimedia information associated with the first APP refers to first multimedia information to be played during the time period when the first APP is waited to be started.

In step S103, the first multimedia information is received. The first multimedia information includes prompting information in an interaction form.

Specifically, the terminal receives from the server the first multimedia information including the prompting information in the interaction form, after sending the first request configured to request for acquisition of the first multimedia information associated with the first APP to the server during the time period when the first APP is waited to be started.

Here, the prompting information in the interaction form includes at least prompting the user to perform interaction according to a preset interaction strategy to acquire a combination of any of voice control information, input information, selection information and the like, wherein the input information may include a verification code, a specific character or the like, and the selection information may include a picture, a character or the like.

In an embodiment, after the terminal receives the first multimedia information, the method further includes any one of the following manners.

A first manner:

the terminal locally stores the first multimedia information obtained through the first request, for displaying in the display region the prompting information in the interaction form included in the first multimedia information when the first APP is re-started in a later time.

A second manner:

when it is detected that the terminal is in an idle state or that a load state of a network where the terminal is located is lower than a first threshold value, the terminal triggers a second request to the server, the second request being configured to request for acquisition of second multimedia information associated with the first APP; and the terminal locally caches the second multimedia information obtained through the second request, for displaying in the display region prompting information in the interaction form included in the second multimedia information when the first APP is re-started in a later time.

Here, the second multimedia information may be splash screen advertisement information. The splash screen advertisement information may include a picture, video advertisement material or the like. The second multimedia information is different from the first multimedia information.

In step S104, the first multimedia information is played, and the prompting information in the interaction form is displayed in the display region.

Specifically, the terminal plays the first multimedia information after receiving from the server the first multimedia information including the prompting information in the interaction form, and displays in the display region the prompting information in the interaction form in a process of playing the first multimedia information.

In step S105, a second operation for the prompting information in the interaction form is acquired, and the first APP is started after an operation result is obtained.

Specifically, the terminal acquires the second operation for the prompting information in the interaction form when triggering interaction with the prompting information in the interaction form. The terminal starts the first APP after the operation result is obtained. Here, when the prompting information in the interaction form includes at least prompting the user to perform interaction according to the preset interaction strategy to acquire the voice control information. The operation that the second operation is acquired when interaction with the prompting information in the interaction form is triggered includes that: the voice control information is acquired through voice acquisition apparatus in the terminal, during interaction with the user according to the preset interaction strategy.

In an example, when the prompting information in the interaction form includes at least prompting the user to perform interaction according to the preset interaction strategy to acquire the voice control information. The specific implementation process of steps S104~S105 may be as follow: when prompting information for requesting the user to sing a first sentence of a song named after "On a road" is popped up in the display region in the process that the terminal plays the first multimedia information, after the user sings "It's the day when I have to depart", the terminal acquires voice control information related to "It's the day when I have to depart" through own voice acquisition apparatus, and starts the first APP.

In another example, when the prompting information in the interaction form includes at least prompting the user to perform interaction according to the preset interaction strategy to acquire the input information such as the verification code or the specific character, the specific implementation process of steps S104~S105 may be as follows: when prompting information for requesting the user to input the input information such as a verification code "ab2c" or a specific character "星期一" is popped up in the display region in the process that the terminal plays the first multimedia information, after the user inputs "ab2c" or "星期一" in a corresponding input box through a keyboard or the touch screen in an interaction manner, the terminal acquires input information related to "ab2c" or "星期一", and starts the first APP.

In another example, when the prompting information in the interaction form includes at least prompting the user to perform interaction according to the preset interaction strategy to acquire the selection information of the picture or the character, the specific implementation process of steps S104~S105 may be as follows: when a floating display window including multiple pictures or multiple sets of characters is popped up in the display region and prompting information for requesting the user to select a picture or character consistent with a specific requirement from the multiple pictures or multiple sets of characters displayed in the floating display window are popped up in the display region in the process that the terminal plays the first multimedia information, after the user selects the picture or character consistent with the specific requirement in the floating display window through the mouse, the keyboard or the touch screen in the interaction manner, the terminal acquires selection information related to the picture or the character, and starts the first APP.

According to the multimedia information processing method of the first embodiment of the disclosure, the terminal acquires the first operation which indicates to start the first APP, triggers the first request for acquisition of the first multimedia information associated with the first APP to the server during the time period when the first APP is waited to be started, receives the first multimedia information including the prompting information in the interaction form from the server, plays the first multimedia information, displays the prompting information in the interaction form in the display region, acquires the second operation for the prompting information in the interaction form, and starts the first APP after the operation result is obtained. Therefore, types of splash screen advertisements are expanded, and interaction with the user is added to achieve a splash screen advertisement promotion deepening effect and improve user experiences.

Second Embodiment

Figure 2:
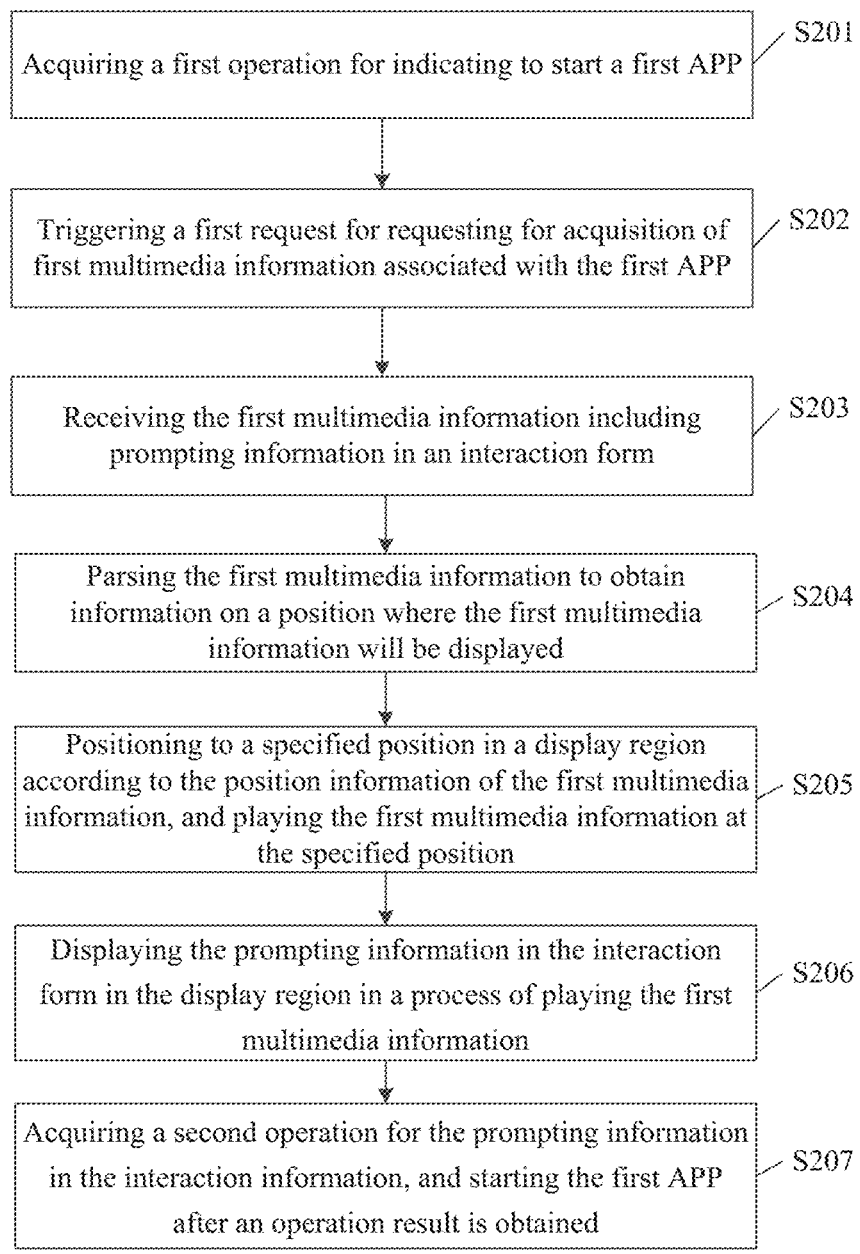
FIG. 2 is an implementation flowchart of a multimedia information processing method according to a second embodiment of the disclosure.

The embodiment of the disclosure provides a multimedia information processing method. The multimedia information processing method is applied to a terminal. The terminal has a display region. FIG. 2 is an implementation flowchart of a multimedia information processing method according to the second embodiment of the disclosure. As shown in FIG. 2, the method includes the following steps.

In step S201, a first operation is acquired. The first operation is configured to indicate to start a first APP.

Specifically, the first operation may be that a user selects and triggers an icon of multiple APP icons corresponding to the first APP in a display interface of the terminal by clicking a mouse, a button or a touch screen to trigger the terminal to start the first APP. Correspondingly, the terminal acquires the first operation which indicates to start the first APP.

In step S202, a first request is triggered. The first request is configured to request for acquisition of first multimedia information associated with the first APP.

Here, the operation that the first request is triggered may be implemented as follows: the terminal sends the first request for acquisition of the first multimedia information associated with the first APP to a server, during a time period when the terminal is waiting for the first APP to be started.

In the embodiment, the first multimedia information may be splash screen advertisement information. The splash screen advertisement information may include a picture, video advertisement material or the like.

Here, the first multimedia information associated with the first APP refers to first multimedia information to be played during the time period when the first APP is waited to be started.

In step S203, the first multimedia information is received. The first multimedia information includes prompting information in an interaction form.

Here, the first multimedia information further includes information on the position where the first multimedia information is displayed. The information on the position may be a coordinate corresponding to a specified position of the display region, or a direction corresponding to the specified position of the display region, such as a left upper corner, a left lower corner, a right upper corner, a right lower corner or a center.

Specifically, the terminal receives from the server the first multimedia information including the prompting information in the interaction form, after sending the first request configured to request for acquisition of the first multimedia information associated with the first APP to the server during the time period when the first APP is waited to be started.

Here, the prompting information in the interaction form includes at least prompting the user to perform interaction according to a preset interaction strategy to acquire a combination of any of voice control information, input information, selection information and the like. The input information may include a verification code, a specific character or the like, and the selection information may include a picture, a character or the like.

In step S204, the first multimedia information is parsed to obtain information on the position where the first multimedia information is displayed.

Specifically, after receiving the first multimedia information including the information on the position where the first multimedia information is displayed, the terminal parses the first multimedia information to obtain the information on the position where the first multimedia information is displayed, such as the coordinate corresponding to the specified position of the display region or the direction corresponding to the specified position of the display region, such as the left upper corner, the left lower corner, the right upper corner, the right lower corner or the center.

In step S205, positioning to a specified position in the display region is executed according to the information on the position of the first multimedia information, and the first multimedia information is played at the specified position.

Specifically, positioning to the specified position in the display region, for example, positioning to the coordinate of the display region or positioning to the direction of the display region, is specified according to the information on the position of the first multimedia information; and then the first multimedia information is played at the specified position.

In step S206, in a process of playing the first multimedia information, the prompting information in the interaction form is displayed in the display region.

Specifically, the terminal plays the first multimedia information after receiving the first multimedia information including the prompting information in the interaction form from the server, and displays the prompting information in the interaction form in the process of playing the first multimedia information.

In step S207, a second operation for the prompting information in the interaction form is acquired, and the first APP is started after an operation result is obtained.

According to the multimedia information processing method of the second embodiment of the disclosure, the terminal receives the first multimedia information including the prompting information in the interaction form from the server, the first multimedia information further including the information on the position where the first multimedia information is displayed. The terminal then parses the first multimedia information to obtain the information on the position where the first multimedia information is displayed, and executes positioning to the specified position in the display region according to the information on the position of the first multimedia information. The terminal then plays the first multimedia information at the specified position, and displays the prompting information in the interaction form in the process of playing the first multimedia information. The terminal then acquires the second operation for the prompting information in the interaction form, and starts the first APP after the operation result is obtained. Therefore, types of splash screen advertisements are expanded, and interaction with the user is added to achieve a splash screen advertisement promotion deepening effect and improve user experiences.

Third Embodiment

Figure 3:
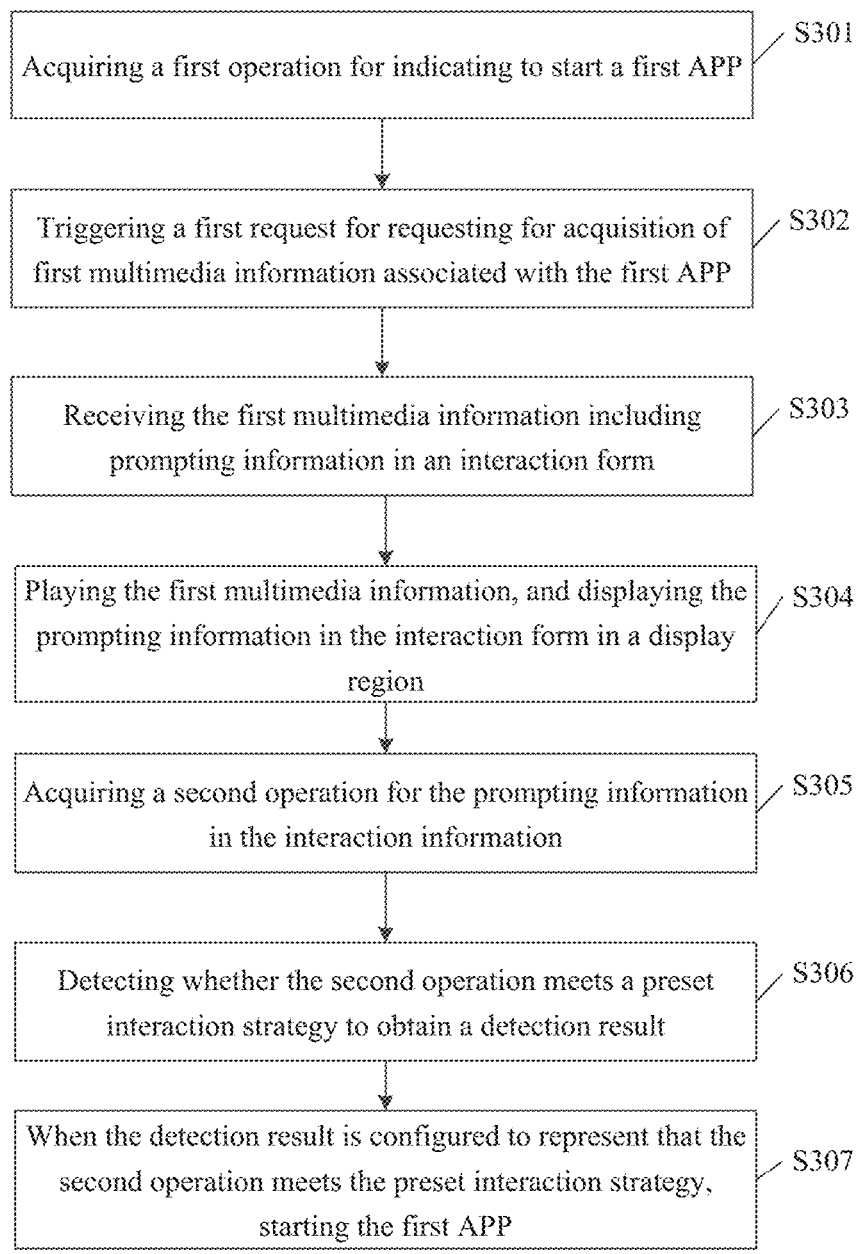
FIG. 3 is an implementation flowchart of a multimedia information processing method according to a third embodiment of the disclosure.

The embodiment of the disclosure provides a multimedia information processing method. The multimedia information processing method is applied to a terminal. The terminal has a display region. FIG. 3 is an implementation flowchart of a multimedia information processing method according to the third embodiment of the disclosure. As shown in FIG. 3, the method includes the following steps.

In step S301, a first operation is acquired. The first operation is configured to indicate to start a first APP.

Specifically, the first operation may be that a user selects and triggers an icon of multiple APP icons corresponding to the first APP in a display interface of the terminal by clicking a mouse, a button or a touch screen to trigger the terminal to start the first APP. Correspondingly, the terminal acquires the first operation which indicates to start the first APP.

In step S302, a first request is triggered. The first request is configured to request for acquisition of first multimedia information associated with the first APP.

Here, the operation that the first request is triggered is implemented as follows: the terminal sends the first request for acquisition of the first multimedia information associated with the first APP to a server during a time period when the terminal is waiting for the first APP to be started.

In the embodiment, the first multimedia information may be splash screen advertisement information, and the splash screen advertisement information may include a picture, video advertisement material or the like.

Here, the first multimedia information associated with the first APP refers to first multimedia information to be played during the time period when the first APP is waited to be started.

In step S303, the first multimedia information is received. The first multimedia information includes prompting information in an interaction form.

Specifically, the terminal receives the first multimedia information including the prompting information in the interaction form from the server, after sending the first request configured to request for acquisition of the first multimedia information associated with the first APP to the server during the time period when the first APP is waited to be started.

Here, the prompting information in the interaction form includes at least prompting the user to perform interaction according to a preset interaction strategy to acquire a combination of any of voice control information, input information, selection information and the like. Here, the input information may include a verification code, a specific character or the like, and the selection information may include a picture, a character or the like.

In step S304, the first multimedia information is played, and the prompting information in the interaction form is displayed in the display region.

Specifically, the terminal plays the first multimedia information after receiving the first multimedia information including the prompting information in the interaction form from the server, and displays the prompting information in the interaction form in a process of playing the first multimedia information.

In step S305, a second operation for the prompting information in the interaction form is acquired.

Specifically, the terminal acquires the second operation for the prompting information in the interaction form when triggering interaction with the prompting information in the interaction form.

In step S306, whether the second operation meets a preset interaction strategy is detected to obtain a detection result.

Specifically, the terminal detects whether the second operation meets the preset interaction strategy to obtain the detection result. When the detection result is configured to represent that the second operation meets the preset interaction strategy, the process proceeds to subsequent step S307, otherwise the processing flow is ended.

In step S307, when the detection result is configured to represent that the second operation meets the preset interaction strategy, the first APP is started.

In an example, when the prompting information in the interaction form includes at least prompting the user to perform interaction according to the preset interaction strategy to acquire the voice control information, a specific implementation process of Steps S304~S307 may be as follows: when prompting information for requesting the user to sing a first sentence of a song named after "On a road" is popped up in the display region in the process that the terminal plays the first multimedia information, voice control information of the user in a process of interaction with the terminal is acquired through voice acquisition apparatus in the terminal; then, the terminal detects the acquired voice control information, that is, the terminal detects whether the voice control information meets an interaction strategy for a first sentence of the song named after "On a road" or not, i.e. whether the voice control information is "It's the day when I have to depart" or not; and when a detection result indicates that the voice control information is "It's the day when I have to depart", and the first APP is started.

According to the multimedia information processing method of the third embodiment of the disclosure, the terminal acquires the first operation which indicates to start the first APP, triggers the first request for acquisition of the first multimedia information associated with the first APP to the server during the time period when the first APP is waited to be started. The terminal then receives the first multimedia information including the prompting information in the interaction form from the server, plays the first multimedia information, and displays the prompting information in the interaction form in the display region. The terminal then acquires the second operation for the prompting information in the interaction form, detects whether the second operation meets the preset interaction strategy to obtain the detection result. The terminal starts the first APP when the detection result is configured to represent that the second operation meets the preset interaction strategy. Therefore, types of splash screen advertisements are expanded, and interaction with the user is added to achieve a splash screen advertisement promotion deepening effect and improve user experiences.

Fourth Embodiment

Figure 4:
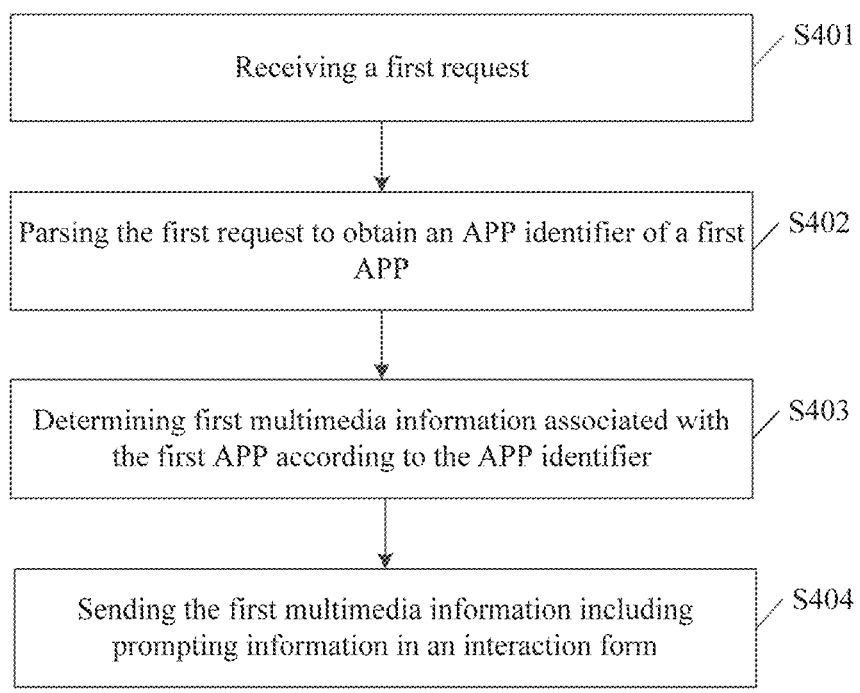
FIG. 4 is an implementation flowchart of a multimedia information processing method according to a fourth embodiment of the disclosure.

The embodiment of the disclosure provides a multimedia information processing method. The multimedia information processing method is applied to a server. FIG. 4 is an implementation flowchart of a multimedia information processing method according to the fourth embodiment of the disclosure. As shown in FIG. 4, the method includes the following steps.

In steps S401~S402, a first request is received, and the first request is parsed to obtain an APP identifier of a first APP.

Here, the first request is configured to represent that a terminal requests the server for acquisition of first multimedia information associated with the first APP.

Here, the first request contains the APP identifier of the first APP.

Specifically, the server receives the first request, triggered by the terminal, for acquisition of the first multimedia information associated with the first APP, and then parses the first request to obtain the APP identifier of the first APP.

Here, the first APP includes a video APP, a navigation APP, an E-commerce APP, a game APP, a chatting APP and the like. Here, the video APP may be YouKu, Tencent Video and the like. The APP identifier of the first APP includes at least an APP type and an APP name.

Here, before the server receives the first request, the server has established a connection with the terminal. Here, a network connection is established between the server and the terminal, and the network connection may be a wired connection, a wireless connection or a wired and wireless mixed network connection. For example, the server and the terminal may establish the wireless connection in a wireless connection manner. The wireless connection manner may specifically be a WiFi connection manner or a Bluetooth connection manner. Specifically, each of the server and the terminal is provided with a WiFi module (or a Bluetooth module), and the server establishes the wireless connection with the WiFi module (or Bluetooth module) of the terminal through own WiFi module (or Bluetooth module).

In step S403, first multimedia information associated with the first APP is determined according to the APP identifier.

Here, the server finds the first multimedia information associated with the first APP from a pre-stored multimedia information database according to the APP identifier. Here, the first multimedia information may be splash screen advertisement information, and the splash screen advertisement information may include a picture, video advertisement material or the like. The first multimedia information associated with the first APP refers to first multimedia information to be played during a time period when the terminal is waiting for starting the first APP.

It is to be noted that an advertiser has uploaded the splash screen advertisement information (such as a splash screen H5 advertisement material) to own advertisement delivery system of the server before the server executes the multimedia information processing method of the embodiment of the disclosure. Furthermore, the advertisement delivery system performs qualification examination on the splash screen advertisement information, and stores it into the multimedia information database after successful examination. In a practical application, the server stores multimedia information and APP identifiers of a terminal side with one-to-one correspondence to represent the multimedia information, corresponding to a certain APP identifier, to be played during a time period when the terminal is waiting for an APP corresponding to the APP identifier to be started.

In step S404, the first multimedia information is sent. The first multimedia information includes prompting information in an interaction form.

Specifically, after determining the first multimedia information associated with the first APP according to the APP identifier, the server sends the first multimedia information including the prompting information in the interaction form to the terminal to enable the terminal to play the first multimedia information during the time period when the first APP is waited to be started.

Here, the prompting information in the interaction form includes at least information for prompting a user to interact according to a preset interaction strategy to acquire a combination of any of voice control information, input information, selection information and the like. The input information may include a verification code, a specific character or the like, and the selection information may include a picture, a character or the like.

In an embodiment, the first multimedia information further includes information on the position where the first multimedia information is displayed. The information on the position may be a coordinate corresponding to a specified position of the display region, or a direction corresponding to the specified position of the display region, such as a left upper corner, a left lower corner, a right upper corner, a right lower corner or a center.

In an embodiment, the method further includes that: the server may receive a second request triggered by the terminal to request for acquisition of second multimedia information associated with the first APP; similarly, the second request is parsed to obtain the APP identifier of the first APP according to the APP; the second multimedia information associated with the first APP is determined according to the APP identifier; and the second multimedia information is sent to the terminal, the second multimedia information including prompting information in the interaction form.

Here, the second multimedia information may be splash screen advertisement information. The splash screen advertisement information may include a picture, video advertisement material or the like. The second multimedia information is different from the first multimedia information.

According to the multimedia information processing method of the fourth embodiment of the disclosure, the server receives the first request, parses the first request to obtain the APP identifier of the first APP, determines the first multimedia information associated with the first APP according to the APP identifier, and sends the first multimedia information including the prompting information in the interaction form to enable the terminal to play the first multimedia information including the prompting information in the interaction form during the time period when the first APP is waited to be started. Therefore, types of splash screen advertisements are expanded, and interaction with the user is added to achieve a splash screen advertisement promotion deepening effect and improve user experiences.

Fifth Embodiment

Figure 5:
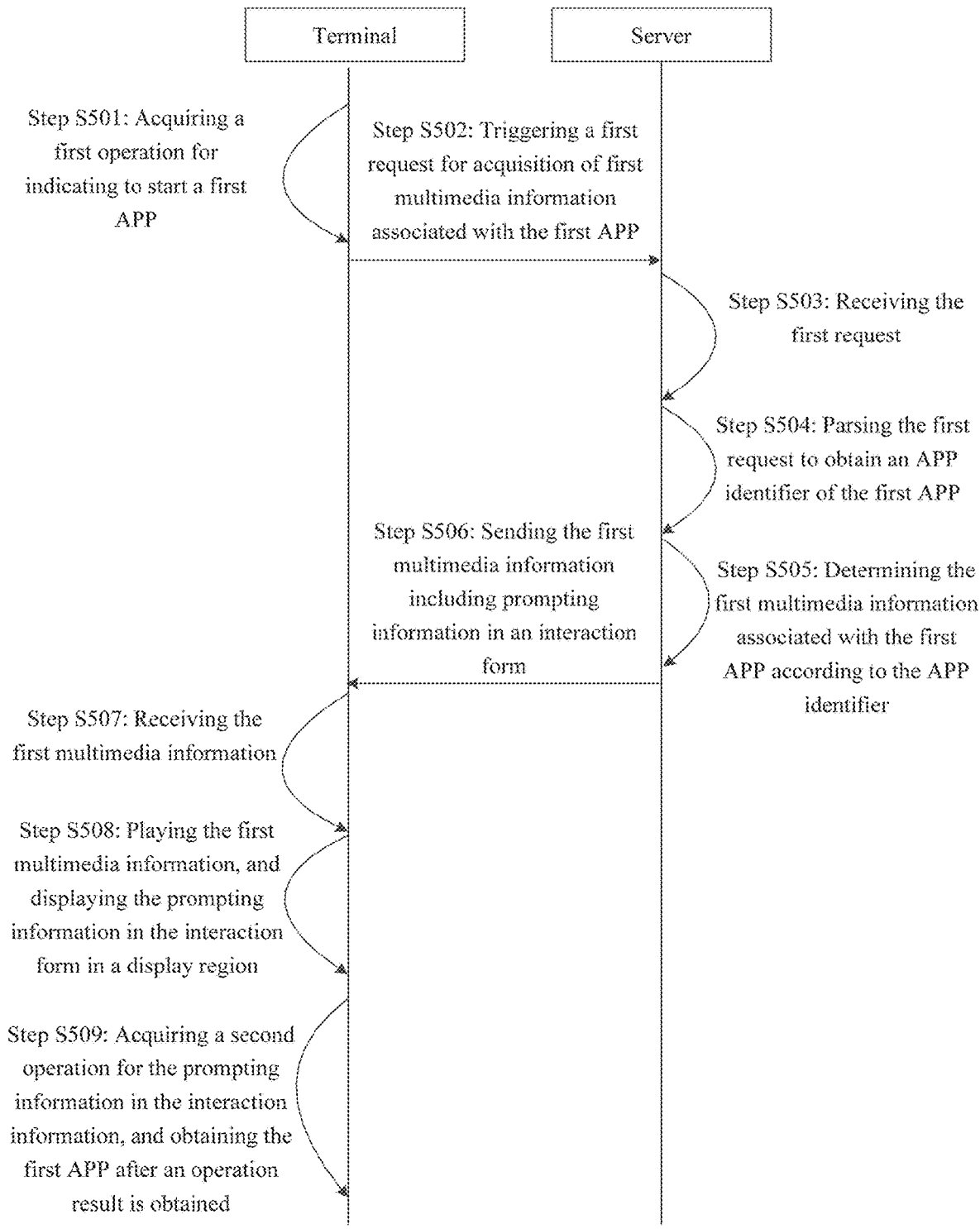
FIG. 5 is an implementation flowchart of a multimedia information processing method according to a fifth embodiment of the disclosure.

The embodiment of the disclosure provides a multimedia information processing method. The multimedia information processing method is applied to a terminal and a server. The terminal has a display region. FIG. 5 is an implementation flowchart of a multimedia information processing method according to the fifth embodiment of the disclosure. As shown in FIG. 5, the method includes the following steps.

In step S501, the terminal acquires a first operation configured to indicate to start a first APP.

In step S502, the terminal triggers a first request for acquisition of first multimedia information associated with the first APP.

In step S503, the server receives the first request.

In step S504, the server parses the first request to obtain an APP identifier of the first APP.

In step S505, the server determines the first multimedia information associated with the first APP according to the APP identifier.

In step S506, the server sends the first multimedia information. The first multimedia information includes prompting information in an interaction form.

In step S507, the terminal receives the first multimedia information.

In step S508, the terminal plays the first multimedia information, and displays the prompting information in the interaction form in the display region.

In step S509, the terminal acquires a second operation for the prompting information in the interaction form, and starts the first APP after an operation result is obtained.

In the embodiment, the server sends the first multimedia information including the prompting information in the interaction form to the terminal in step S506 to expand types of splash screen advertisements.

In steps S508~S509 of the embodiment, the terminal plays the first multimedia information, displays the prompting information in the interaction form in the display region, acquires the second operation for the prompting information in the interaction form, and starts the first APP after the operation result is obtained. Therefore, a splash screen advertisement promotion deepening effect is achieved, and user experiences are improved.

Details about the steps executed by the terminal in the embodiment may refer to the first embodiment to the third embodiment; and details about the steps executed by the server may refer to the fourth embodiment.

According to the multimedia information processing method of the fifth embodiment of the disclosure, compared with an existing splash screen advertisement, the server sends the first multimedia information including the prompting information in the interaction form to the terminal to expand the types of the splash screen advertisements. Furthermore, the terminal plays the first multimedia information, displays the prompting information in the interaction form in the display region, acquires the second operation for the prompting information in the interaction form, and starts the first APP after the operation result is obtained. Thus, the splash screen advertisement promotion deepening effect is achieved, and the user experiences are improved.

Sixth Embodiment

Figure 6:
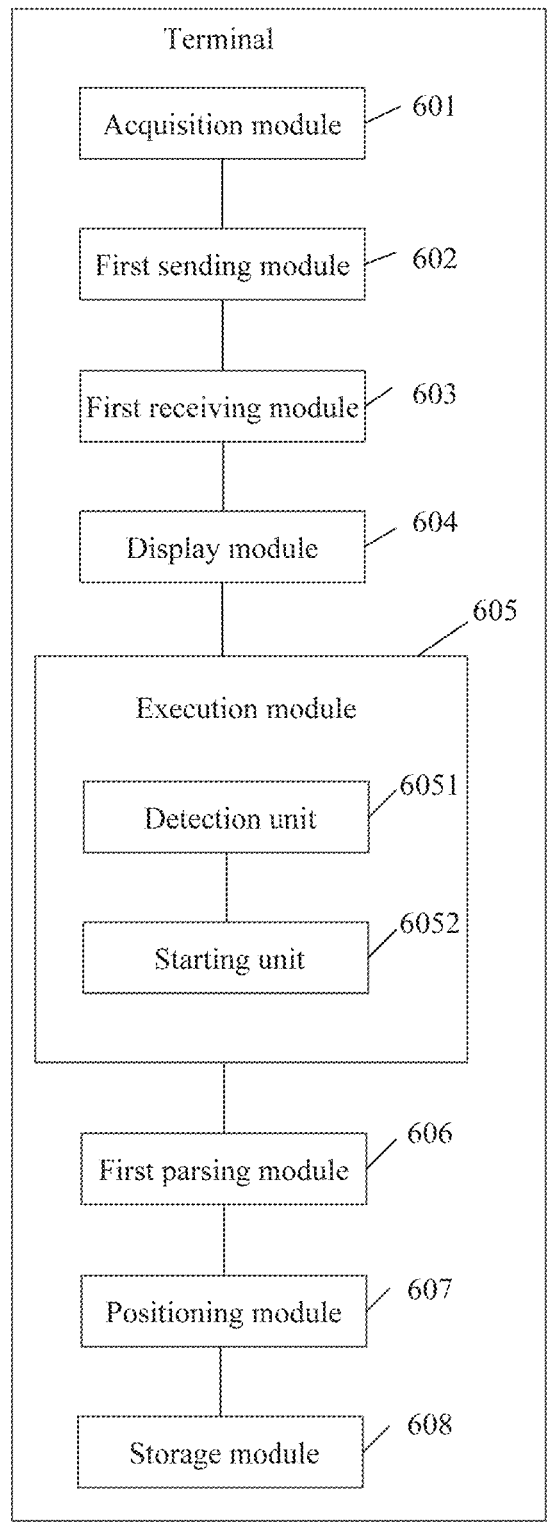
FIG. 6 is a structure diagram of a terminal according to a sixth embodiment of the disclosure.

The embodiment of the disclosure provides a terminal. FIG. 6 is a structure diagram of a terminal according to the sixth embodiment of the disclosure. As shown in FIG. 6, the terminal has a display region. The terminal includes an acquisition module 601, a first sending module 602, a first receiving module 603, a display module 604 and an execution module 605.

The acquisition module 601 is configured to acquire a first operation. The first operation is configured to indicate to start a first APP.

The first sending module 602 is configured to trigger a first request. The first request is configured to request for acquisition of first multimedia information associated with the first APP.

The first receiving module 603 is configured to receive the first multimedia information. The first multimedia information includes prompting information in an interaction form.

The display module 604 is configured to play the first multimedia information through the display, and display the prompting information in the interaction form in the display region.

The execution module 605 is configured to acquire a second operation for the prompting information in the interaction form, and start the first APP after an operation result is obtained.

In an embodiment, as shown in FIG. 6, the first multimedia information further includes information on the position where the first multimedia information is displayed. In the embodiment, the terminal further includes a first parsing module 606 and a positioning module 607.

The first parsing module 606 is configured to parse the first multimedia information to obtain the information on the position where the first multimedia information is displayed.

The positioning module 607 is configured to execute positioning to a specified position in the display region according to the information on the position of the first multimedia information, and play the first multimedia information at the specified position.

In an embodiment, as shown in FIG. 6, the execution module 605 includes a detection unit 6051 and a starting unit 6052.

The detection unit 6051 is configured to detect whether the second operation meets a preset interaction strategy to obtain a detection result.

The starting unit 6052 is configured to, when the detection result is configured to represent that the second operation meets the preset interaction strategy, start the first APP.

In an embodiment, the prompting information in the interaction form includes information for at least prompting a user to interact according to the preset interaction strategy to acquire a combination of any of voice control information, input information and selection information.

Correspondingly, the execution module 605 is further configured to acquire the voice control information through voice acquisition apparatus in the terminal during interaction with the user according to the preset interaction strategy.

In an embodiment, as shown in FIG. 6, the terminal further includes a storage module 608.

The storage module 608 is configured to locally store the first multimedia information obtained through the first request for displaying the prompting information in the interaction form in the first multimedia information in the display region when the first APP is re-started in a later time.

Alternatively, the first sending module 602 is further configured to, when it is detected that the terminal is in an idle state or that a load state of a network where the terminal is located is lower than a first threshold value, trigger a second request. The second request is configured to request for acquisition of second multimedia information associated with the first APP.

The first receiving module 603 is further configured to receive the second multimedia information.

The storage module 608 is further configured to locally cache the second multimedia information obtained through the second request, for displaying prompting information in the interaction form in the second multimedia information in the display region when the first APP is re-started in a later time.

During a practical application, all of specific structures of the acquisition module 601, the execution module 605, the first parsing module 606, the positioning module 607, as well as the detection unit 6051 and starting unit 6052 included in the execution module 605 may correspond to a processor. A specific structure of the processor may be an electronic component with a processing function, such as a Central Processing Unit (CPU), a Micro Control Unit (MCU), a Digital Signal Processor (DSP) or a Programmable Logic Controller (PLC), or a set of the electronic components. The processor includes an executable code, the executable code is stored in a storage medium, the processor may be connected with the storage medium through a communication interface such as a bus, and when executing a corresponding function of each specific module, reads from the storage medium and runs the executable code. A part, configured to store the executable code, of the storage medium is preferably a non-transitory storage medium. A specific structure of the storage module 608 may correspond to a memory.

The acquisition module 601, the execution module 605, the first parsing module 606 and the positioning module 607 may be correspondingly integrated in the same processor, or correspond to different processors respectively. When acquisition module 601, the execution module 605, the first parsing module 606 and the positioning module 607 are correspondingly integrated in the same processor, the processor processes the corresponding functions of the acquisition module 601, the execution module 605, the first parsing module 606 and the positioning module 607 in a time division manner.

A specific structure of the first sending module 602 is a sending interface, including wired and wireless sending interfaces, specifically such as a sending antenna or a cable sending interface.

A specific structure of the first receiving module 603 is a receiving interface, including wired and wireless receiving interfaces, specifically such as various cable communication interfaces like a twisted pair interface, an optical fiber interface or a receiving antenna. In a specific implementation process, the first sending module 602 and the first receiving module 603 may correspond to the same communication interface. An existing communication interface may usually have both sending and receiving functions.

The terminal of the sixth embodiment of the disclosure provides specific implementation hardware for the methods of embodiments 1 to 3, and may be configured to implement any technical solution in embodiments 1 to 3. Therefore, types of splash screen advertisements are expanded, and interaction with a user is added to achieve a splash screen advertisement promotion deepening effect and improve user experiences.

Seventh Embodiment

Figure 7:
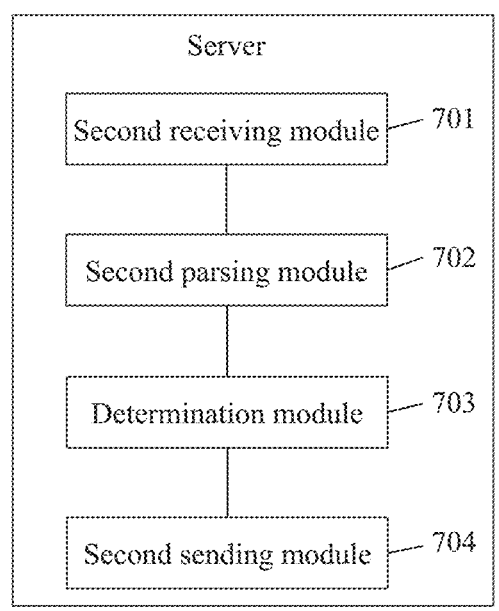
FIG. 7 is a structure diagram of a server according to a seventh embodiment of the disclosure.

The embodiment of the disclosure provides a server. FIG. 7 is a structure diagram of a server according to the seventh embodiment of the disclosure. As shown in FIG. 7, the server includes: a second receiving module 701, a second parsing module 702, a determination module 703 and a second sending module 704.

The second receiving module 701 is configured to receive a first request.

The second parsing module 702 is configured to parse the first request to obtain an APP identifier of a first APP.

The determination module 703 is configured to determine first multimedia information associated with the first APP according to the APP identifier.

The second sending module 704 is configured to send the first multimedia information. The first multimedia information includes prompting information in an interaction form.

During a practical application, specific structures of the second parsing module 702 and the determination module 703 may both correspond to a processor. A specific structure of the processor may be an electronic component with a processing function, such as a CPU, an MCU, a DSP or a PLC, or a set of the electronic components. The processor includes an executable code, the executable code is stored in a storage medium. The processor may be connected with the storage medium through a communication interface such as a bus, and when executing a corresponding function of each specific module, reads from the storage medium and runs the executable code. A part, configured to store the executable code, of the storage medium is preferably a non-transitory storage medium.

The second parsing module 702 and the determination module 703 may be correspondingly integrated in the same processor, or correspond to different processors respectively. When the second parsing module 702 and the determination module 703 are correspondingly integrated in the same processor, the processor processes the corresponding functions of the second parsing module 702 and the determination module 703 in a time division manner.

A specific structure of the second receiving module 701 is a receiving interface, including wired and wireless receiving interfaces, specifically such as various cable communication interfaces like a twisted pair interface, an optical fiber interface or a receiving antenna.

A specific structure of the second sending module 704 is a sending interface, including wired and wireless sending interfaces, specifically such as a sending antenna or a cable sending interface. In a specific implementation process, the second receiving module 701 and the second sending module 704 may correspond to the same communication interface. An existing communication interface may usually have both sending and receiving functions.

The server of the seventh embodiment of the disclosure provides specific implementation hardware for the method of the fourth embodiment, and may be configured to implement any technical solution in the fourth embodiment. Therefore, types of splash screen advertisements are expanded, and interaction with a user is added to achieve a splash screen advertisement promotion deepening effect and improve user experiences.

Eighth Embodiment

Figure 8:
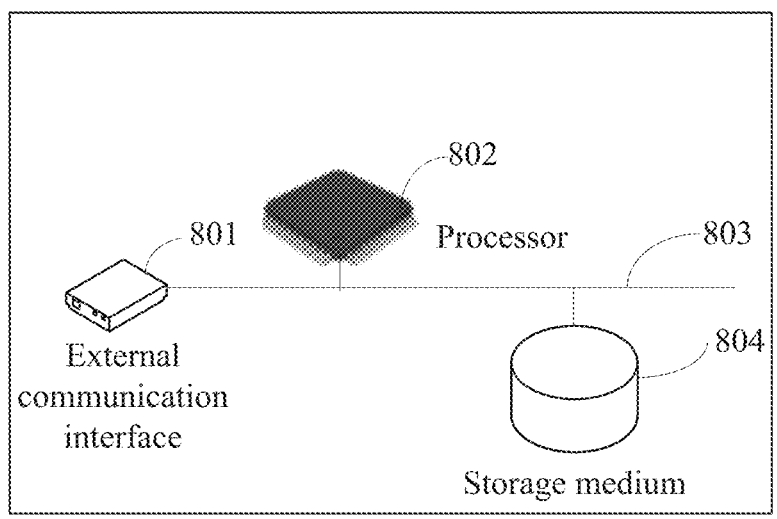
FIG. 8 is a hardware structure diagram of a server and a terminal according to an eighth embodiment of the disclosure.

The embodiment provides a specific hardware on the basis of any apparatus embodiment in the sixth embodiment and the seventh embodiment. As shown in FIG. 8, the device includes a processor 802, a storage medium 804 and at least one external communication interface 801. The processor 802, the storage medium 804 and the external communication interface 801 are all connected through a bus 803. The processor 802 may be an electronic component with a processing function, such as an MCU, a CPU, a DSP or a PLC. A computer-executable code is stored in the storage medium 804.

The hardware may be the server or the terminal.

When the hardware is the terminal, the processor 802 executes the computer-executable code to realize at least the following functions:

acquiring a first operation, the first operation being configured to indicate a first APP to be started;

triggering a first request, the first request being configured to request for acquisition of first multimedia information associated with the first APP;

receiving the first multimedia information, the first multimedia information including prompting information in an interaction form;

playing the first multimedia information, and displaying the prompting information in the interaction form in the display region; and acquiring a second operation for the prompting information in the interaction form, and starting the first APP after an operation result is obtained.

When the hardware is the server, the processor 802 executes the computer-executable code to realize at least the following functions:

receiving the first request;

parsing the first request to obtain an APP identifier of the first APP;

determining the first multimedia information associated with the first APP according to the APP identifier; and sending the first multimedia information.

Ninth Embodiment

Figure 9:
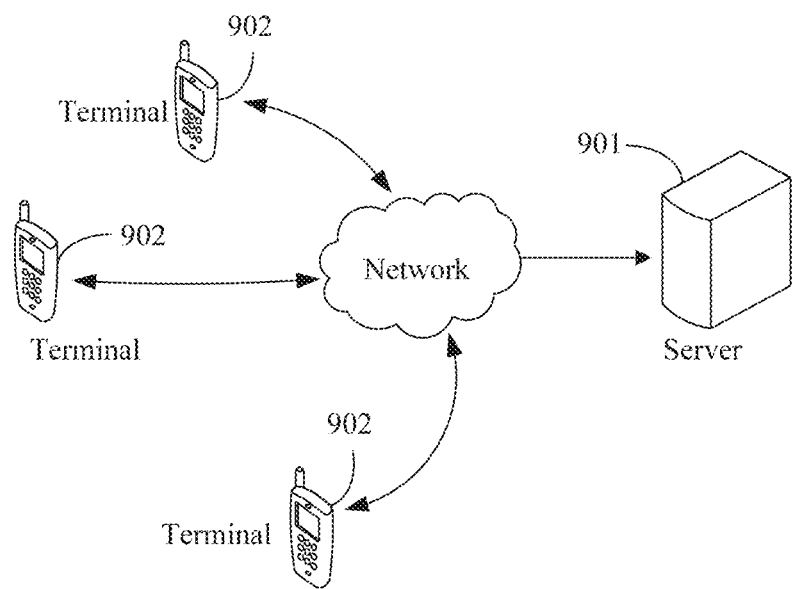
FIG. 9 is a structure diagram of a multimedia information processing system according to an embodiment of the disclosure.

As shown in FIG. 9, the embodiment provides a multimedia information processing system, which includes a server 901 and terminals 902. The server 901 is connected with at least one terminal 902 through a network. The network may be a wired network, a wireless network or a wired and wireless mixed network. The system is configured to execute the multimedia information processing method in the fifth embodiment.

Tenth Embodiment

Figure 11:
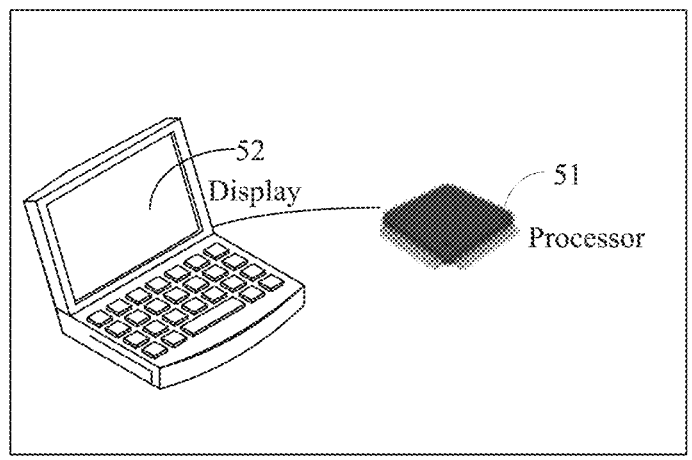
FIG. 11 is a hardware entity diagram of a terminal according to a tenth embodiment of the disclosure.

The embodiment of the disclosure provides a terminal. The terminal has a display region. The terminal includes a processor 51 and a display 52, as shown in FIG. 11.

The processor 51 is configured to execute the following operations through executable instructions:

acquiring a first operation, the first operation being configured to indicate a first APP to be started;

triggering a first request, the first request being configured to request for acquisition of first multimedia information associated with the first APP;

receiving the first multimedia information, the first multimedia information including prompting information in an interaction form;

playing the first multimedia information through the display 52, and displaying the prompting information in the interaction form in the display region; and acquiring a second operation for the prompting information in the interaction form, and starting the first APP after an operation result is obtained.

Eleventh Embodiment

Figure 12:
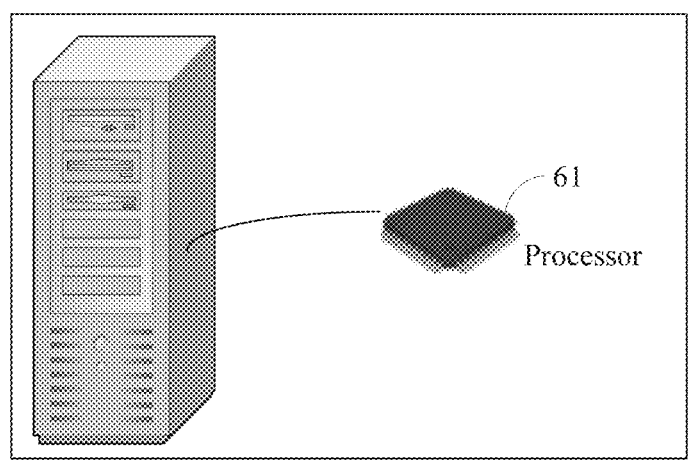
FIG. 12 is a hardware entity diagram of a server according to a eleventh embodiment of the disclosure.

The embodiment of the disclosure provides a server. The server includes a processor 61, as shown in FIG. 12.

The processor 61 is configured to execute the following operations through executable instructions:

receiving a first request:

parsing the first request to obtain an APP identifier of a first APP:

determining first multimedia information associated with the first APP according to the APP identifier; and sending the first multimedia information, the first multimedia information including prompting information in an interaction form.

Correspondingly, the embodiment of the disclosure further provides a computer storage medium, in which a computer program is stored, the computer program being configured to execute the abovementioned multimedia information processing method of the embodiment of the disclosure.

Specific Application Scenario

In an application example of the disclosure, an advertiser uploads a splash screen H5 material to an advertisement delivery system of a server to deliver a splash screen H5 advertisement. Then, the advertisement delivery system in the server performs qualification examination on the splash screen H5 advertisement, and waits the terminal for displaying the splash screen H5 advertisement within a time period when an APP is started after successful examination. With reference to display effect diagrams, shown in FIG. 10-1 to FIG. 10-6, of a user interface of a terminal corresponding to a multimedia information processing method according to an application example of the disclosure, the multimedia information processing method in the application example of the disclosure specifically includes the following steps.

In step 1, when a user of the terminal wants to watch a video, a first operation is triggered to cause the terminal to get ready to start a video APP after acquiring a first operation.

In step 2, the terminal starts an advertisement Software Development Kit (SDK) to trigger a first request for acquisition of first multimedia information associated with the first APP when starting the video APP.

In step 3, the advertisement SDK acquires splash screen H5 advertisement information from the advertisement delivery system of the server.

Here, the splash screen H5 advertisement information includes information such as an advertisement space and a splash screen H5 material.

Figures 1, 10:
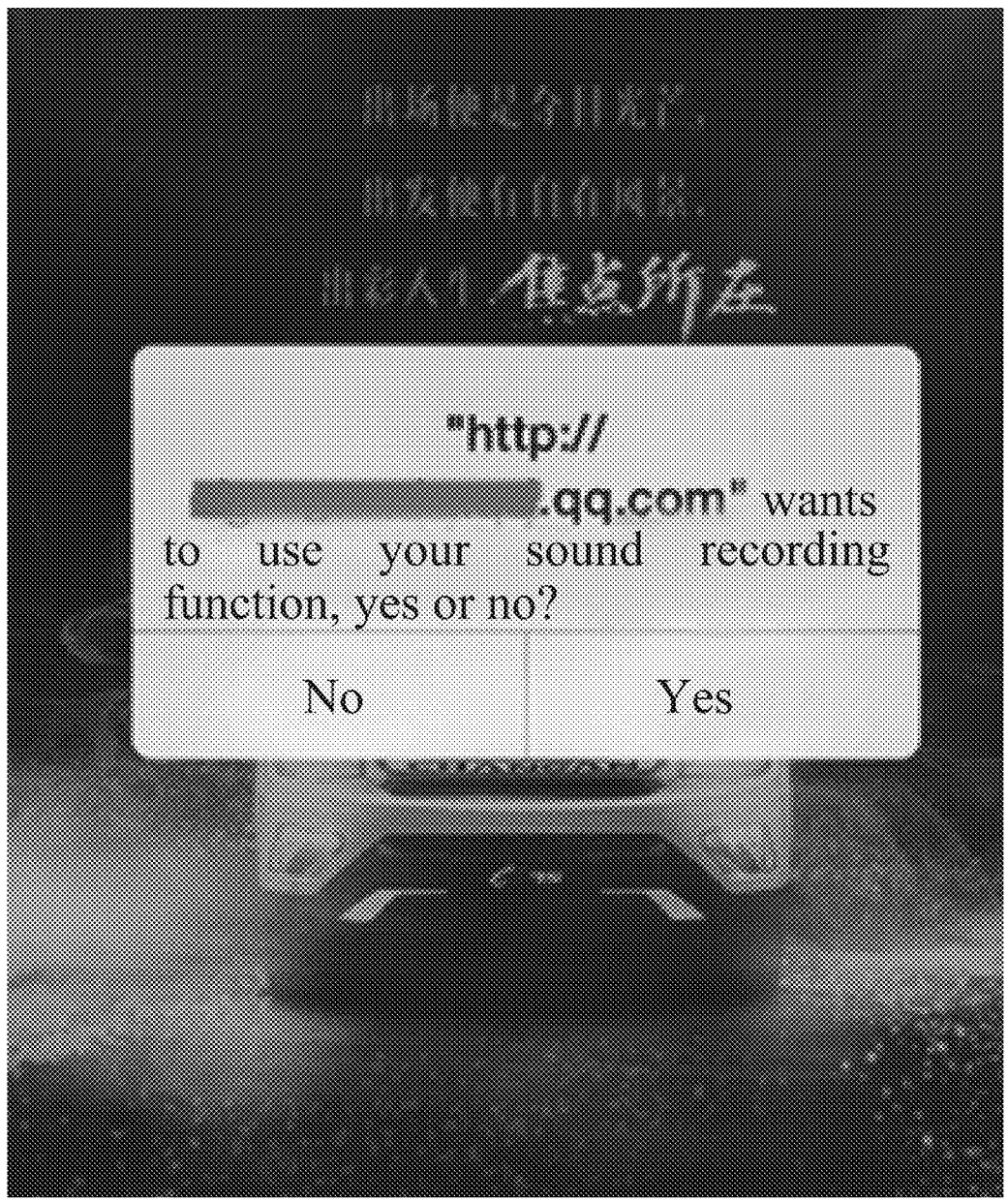
Figures 2, 10:
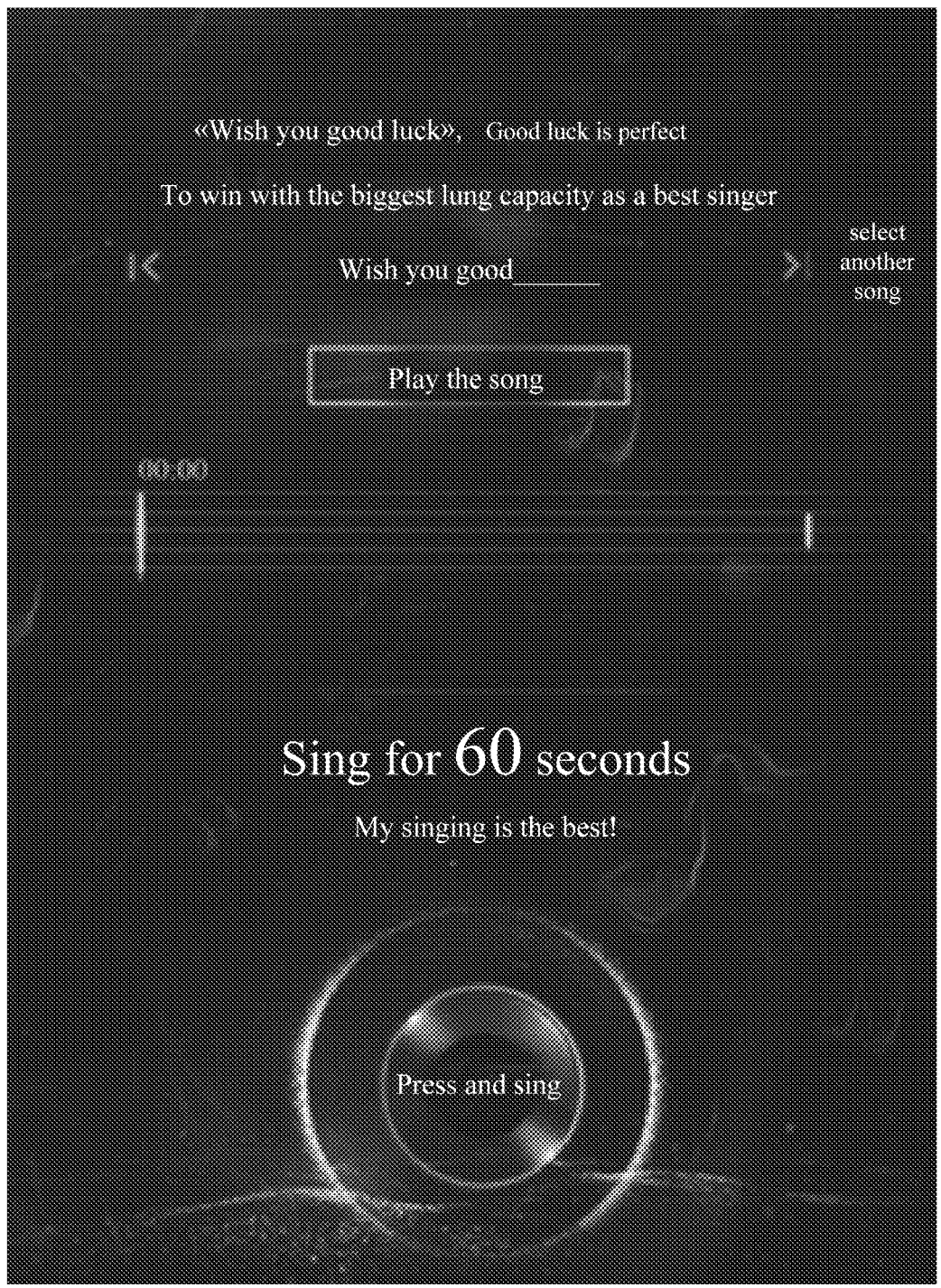
Figures 3, 10:
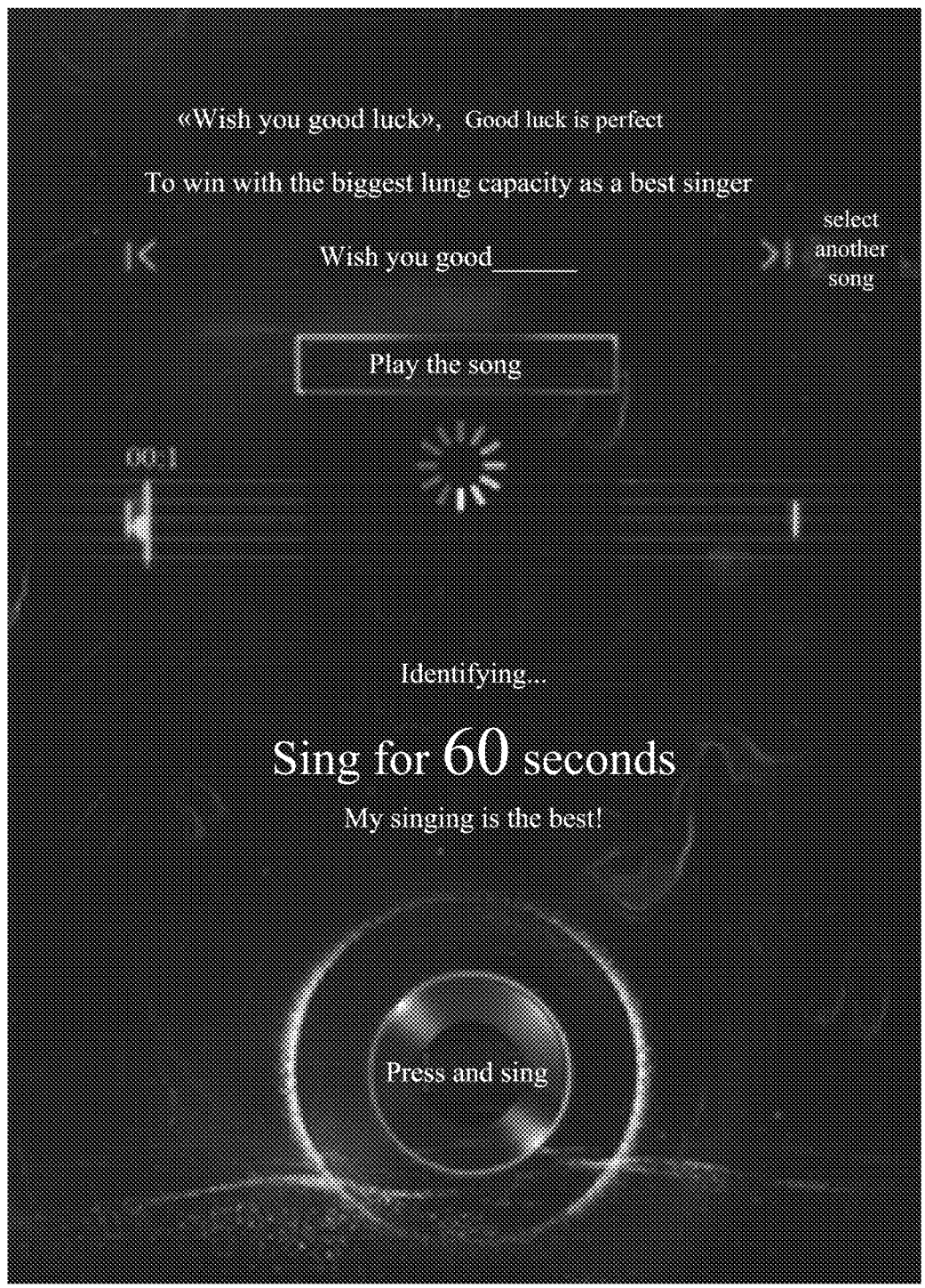
Figures 4, 10:
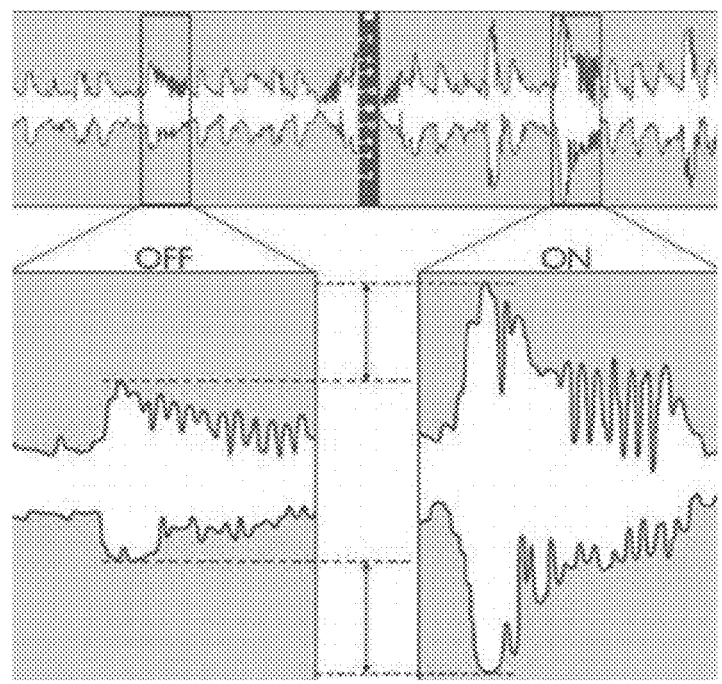
Figures 5, 10:
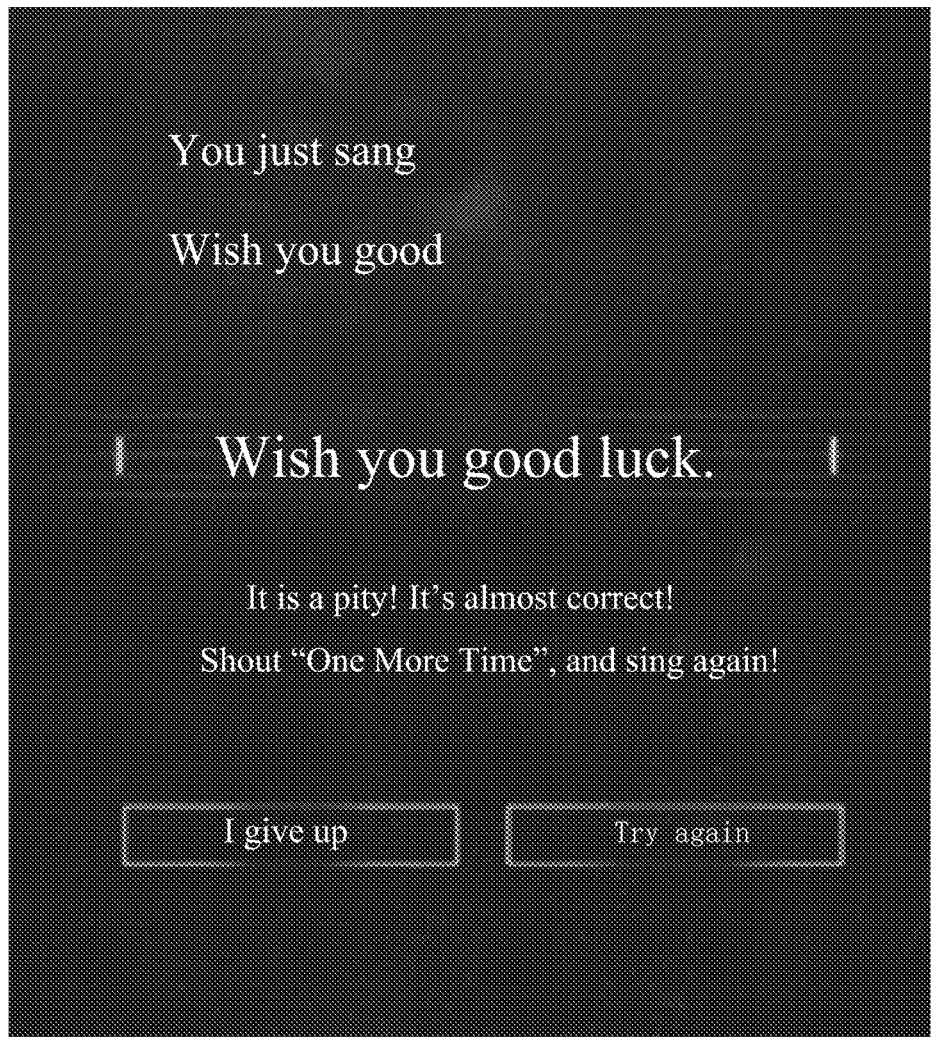
Figures 6, 10:

It is to be noted here that the advertisement SDK is started to preload the splash screen H5 material in a local video APP in a manner of triggering a second request for acquisition of second multimedia information associated with the first APP when the terminal is in an idle state or that a load state of a network where the terminal is located is lower than a first threshold value, so that the advertisement SDK may directly play the splash screen H5 material when the video APP is subsequently started again.

in step 4, the splash screen H5 material calls a microphone function of the terminal, and prompts the user whether to allow a sound recording function of the user to be enabled or not, as shown in FIG. 10-1.

In step 5, when the user allows the sound recording function, a splash screen advertisement enters a next page, that is, the user is prompted to press a sing button and sing according to a prompting character, as shown in FIG. 10-2.

In step 6, after the user presses the sing button, the splash screen H5 material performs sound recording and voice recognition, as shown in FIG. 10-3.

In step 7, the terminal compares a waveband of recorded sounds with a voice waveband of a prepared text, and if the wavebands are not similar to each other, it is indicated that the user accurately sings according to the prompting text, it is determined that the user sings the correct lyrics, and subsequent step 8 is continued to be executed, as shown in FIG. 10-4.

Here, in step 7, if the wavebands are not similar to each other, it is indicated that the user does not accurately sing according to the prompting text, it is determined that the user sings the wrong lyrics, and then the splash screen advertisement enters the next page. That is, the user is prompted to sing the wrong lyrics and requested to sing again, as shown in FIG. 10-5.

In step 8, when the user sings the correct lyrics, a prompt, congratulations for high scores and welcome to the video, is given, and the splash screen H5 advertisement enters a home page of the video APP after voice control interaction, as shown in FIG. 10-6.

Therefore, types of splash screen advertisements are expanded, and interaction with a user is added to achieve a splash screen advertisement promotion deepening effect and improve user experiences.

In some embodiments provided by the disclosure, it should be understood that the disclosed apparatus and method may be implemented in another manner. The apparatus embodiment described above is only schematic, and for example, division of the units is only logic function division, and other division manners may be adopted during practical implementation. For example, multiple units or components may be combined or integrated into another system, or some characteristics may be omitted executed. In addition, coupling, or direct coupling or communication connection between each displayed or discussed component may be indirect coupling or communication connection, implemented through some interfaces, of the apparatus or the units, and may be electrical and mechanical or adopt other forms.

The abovementioned units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit. The abovementioned integrated unit may be implemented in a hardware form, and may also be implemented in form of hardware and software function unit.

Those skilled in the art should know that: all or part of the steps of the abovementioned method embodiment may be implemented by instructing related hardware through a program, the abovementioned program may be stored in a computer-readable storage medium, and the program is executed to execute the steps of the abovementioned method embodiment; and the storage medium includes: various media capable of storing program codes such as mobile storage apparatus, a Read-Only Memory (ROM), a Random Access Memory (RAM), a magnetic disk or an optical disk.

Or, when being implemented in form of software function module and sold or used as an independent product, the integrated unit of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a piece of computer apparatus (which may be a PC, a server, network apparatus or the like) to execute all or part of the method in each embodiment of the disclosure. The abovementioned storage medium includes: various media capable of storing program codes such as mobile storage apparatus, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

INDUSTRIAL APPLICABILITY

According to the embodiments of the disclosure, the terminal acquires the first operation, the first operation being configured to indicate the first APP to be started, triggers the first request, the first request being configured to request for acquisition of the first multimedia information associated with the first APP, receives the first multimedia information, the first multimedia information including the prompting information in the interaction form, plays the first multimedia information, displays the prompting information in the interaction form in the display region, acquires the second operation for the prompting information in the interaction form, and starts the first APP after the operation result is obtained. Therefore, types of splash screen advertisements are expanded, and interaction with a user is added to achieve a splash screen advertisement promotion deepening effect and improve user experiences.

The invention claimed is:

1. A multimedia information processing method, comprising:

acquiring, by a terminal, a first operation, the first operation being configured to indicate to start a first Application (APP);

triggering, by the terminal, a first request, the first request being configured to request for acquisition of first multimedia information associated with the first APP;

during a time period when the terminal waits for the first APP to be started, receiving, by the terminal, the first multimedia information, the first multimedia information including first prompting information in a first interaction form;

after receiving the first multimedia information, determining, by the terminal, whether the terminal is in an idle state or a load state of a network where the terminal is located is lower than a first threshold value;

in response to determining the terminal is in the idle state or that the load state of the network where the terminal is located is lower than the first threshold value, triggering, by the terminal, a second request, the second request being configured to request for acquisition of second multimedia information associated with the first APP, the second multimedia information including second prompting information in a second interactive form and being different than the first multimedia information;

playing, by the terminal, the second multimedia information, and displaying the second prompting information in the second interaction form in a display region, wherein the second prompt information in the second interaction form includes at least information for prompting a user to interact according to the preset interaction strategy, and wherein the second prompt information calls a microphone function of a voice acquisition apparatus of the terminal and prompts the user to input singing lyrics into a microphone of the voice acquisition apparatus of the terminal;

displaying, by the terminal, a prompting character, wherein the singing lyrics are inputted by the user as a response to the prompting character;

comparing, by the terminal, a voice waveband of the singing lyrics with a voice waveband of the prompting character as displayed;

acquiring, by the terminal, a second operation for the second prompting information in the second interaction form;

detecting, by the terminal, whether the second operation meets the preset interaction strategy, to obtain a detection result;

starting, by the terminal, the first APP in response to determining the detection result represents that the second operation meets the preset interaction strategy and according to a result of comparison between the voice waveband of the singing lyrics and the voice waveband of the prompting character as displayed; and prompting, by the terminal, the user to sing again according to a result of comparison between the voice waveband of the singing lyrics and the voice waveband of the prompting character as displayed.

2. The method according to claim 1, wherein the second multimedia information further includes information on the position configured to play the second multimedia information, and after receiving the second multimedia information, the method further comprises:

parsing the second multimedia information to obtain the information on the position where the second multimedia information is displayed; and executing positioning to a specified position in the display region according to the information on the position of the second multimedia information, and playing the second multimedia information at the specified position.

3. The method according to claim 1, wherein the second prompting information in the second interaction form includes at least the information for prompting the user to interact according to the preset interaction strategy to acquire a combination of any of voice control information, input information and selection information.

4. The method according to claim 1, after receiving the second multimedia information, further comprising:

locally storing, by the terminal the second multimedia information obtained through the second request, for displaying in the display region the second prompting information in the second interaction form comprised in the second multimedia information when the first APP is re-started in a later time.

5. The method according to claim 1, wherein the second prompting information further includes a verification code or a specific character, and wherein the method further comprises:

displaying, by the terminal, the verification code or the specific character;

receiving, by the terminal, an input from the user respectively corresponding to the verification code or the specific character; and starting, by the terminal, the first APP further in response to receipt by the terminal of the input from the user respectively corresponding to the verification code or the specific character.

6. The method according to claim 1, further comprising:

displaying, by the terminal, a floating display window including multiple pictures or multiple sets of characters;

receiving, by the terminal, a selection of the multiple pictures or the multiple sets of characters by the user; and starting, by the terminal, the first APP further in response to receipt by the terminal of the selection of the multiple pictures or the multiple sets of characters by the user.

7. A terminal, having a display region and comprising: a display and a processor, wherein the processor is configured to execute the following operations through executable instructions:

acquiring a first operation, the first operation being configured to indicate to start a first Application (APP);

triggering a first request, the first request being configured to request for acquisition of first multimedia information associated with the first APP;

during a time period when the terminal waits for the first APP to be started, receiving the first multimedia information, the first multimedia information including first prompting information in a first interaction form;

after receiving the first multimedia information, determining whether the terminal is in an idle state or a load state of a network where the terminal is located is lower than a first threshold value;

in response to determining the terminal is in the idle state or that the load state of the network where the terminal is located is lower than the first threshold value, triggering a second request, the second request being configured to request for acquisition of second multimedia information associated with the first APP, the second multimedia information including second prompting information in a second interactive form and being different than the first multimedia information;

playing the second multimedia information through the display, and displaying in the display region the second prompting information in the second interaction form, wherein the second prompting information in the second interaction form includes at least information for prompting a user to interact according to the preset interaction strategy, and wherein the second prompt information calls a microphone function of a voice acquisition apparatus of the terminal and prompts the user to input singing lyrics into a microphone of the voice acquisition apparatus of the terminal;

displaying, by the terminal, a prompting character, wherein the singing lyrics are inputted by the user as a response to the prompting character;

comparing, by the terminal, a voice waveband of the singing lyrics with a voice waveband of the prompting character as displayed;

acquiring a second operation for the second prompting information in the second interaction form;

detecting whether the second operation meets a preset interaction strategy to obtain a detection result;

starting the first APP in response to determining the detection result represents that the second operation meets the preset interaction strategy and according to a result of comparison between the voice waveband of the singing lyrics and the voice waveband of the prompting character as displayed; and prompting, by the terminal, the user to sing again according to a result of comparison between the voice waveband of the singing lyrics and the voice waveband of the prompting character as displayed.

8. The terminal according to claim 7, wherein the second multimedia information further includes information on the position where the second multimedia information is displayed, and the processor is further configured to execute the following operations through the executable instructions:

parsing the second multimedia information to obtain the information on the position where the second multimedia information is displayed; and executing positioning to a specified position in the display region according to the information on the position of the second multimedia information, and playing the second multimedia information at the specified position.

9. The terminal according to claim 7, wherein the second prompting information in the second interaction form includes at least the information for prompting the user to interact according to the preset interaction strategy to acquire a combination of any of voice control information, input information and selection information.

10. The terminal according to claim 7, further comprising a memory, wherein the memory is configured to locally store the second multimedia information obtained through the second request, for displaying in the display region the second prompting information in the second interaction form comprised in the second multimedia information when the first APP is re-started in a later time.

11. A non-transitory computer-readable storage medium storing computer program instructions executable by at least one processor to perform:

acquiring a first operation, the first operation being configured to indicate to start a first Application (APP);

triggering a first request, the first request being configured to request for acquisition of first multimedia information associated with the first APP;

during a time period when the terminal waits for the first APP to be started, receiving the first multimedia information, the first multimedia information including first prompting information in a first interaction form;

after receiving the first multimedia information, determining whether the terminal is in an idle state or a load state of a network where the terminal is located is lower than a first threshold value;

in response to determining the terminal is in the idle state or that the load state of the network where the terminal is located is lower than the first threshold value, triggering a second request, the second request being configured to request for acquisition of second multimedia information associated with the first APP, the second multimedia information including second prompting information in a second interactive form and being different than the first multimedia information;

playing the second multimedia information, and displaying the second prompting information in the second interaction form in a display region, wherein the second prompt information in the second interaction form includes at least information for prompting a user to interact according to the preset interaction strategy, and wherein the second prompt information calls a microphone function of a voice acquisition apparatus of the terminal and prompts the user to input singing lyrics into a microphone of the voice acquisition apparatus of the terminal;

displaying a prompting character, wherein the singing lyrics are inputted by the user as a response to the prompting character;

comparing a voice waveband of the singing lyrics with a voice waveband of the prompting character as displayed;

acquiring a second operation for the second prompting information in the second interaction form;

detecting whether the second operation meets the preset interaction strategy, to obtain a detection result;

starting the first APP in response to determining the detection result represents that the second operation meets the preset interaction strategy and according to a result of comparison between the voice waveband of the singing lyrics and the voice waveband of the prompting character as displayed; and prompting the user to sing again according to a result of comparison between the voice waveband of the singing lyrics and the voice waveband of the prompting character as displayed.

* * * * *